Dec. 19, 1961 R. C. TAFT, JR., ET AL 3,013,924
METHOD OF PRODUCING FOAM MATERIAL IN WEB FORM
Filed May 21, 1958 4 Sheets-Sheet 1
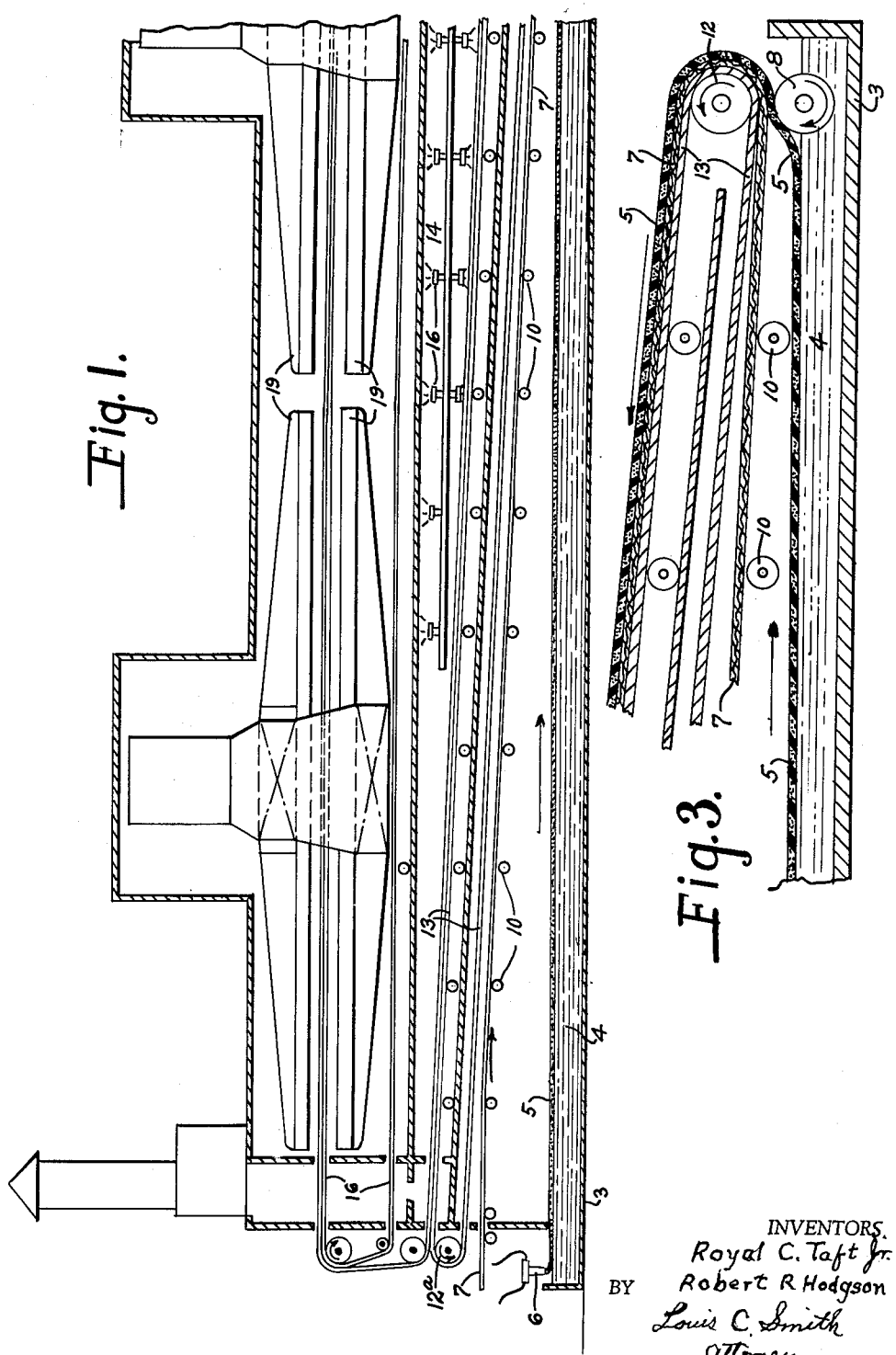
INVENTORS.
Royal C. Taft Jr.
Robert R Hodgson
BY
Louis C. Smith
Attorney Dec. 19, 1961   R. C. TAFT, JR., ET AL   3,013,924
METHOD OF PRODUCING FOAM MATERIAL IN WEB FORM
Filed May 21, 1958   4 Sheets-Sheet 2
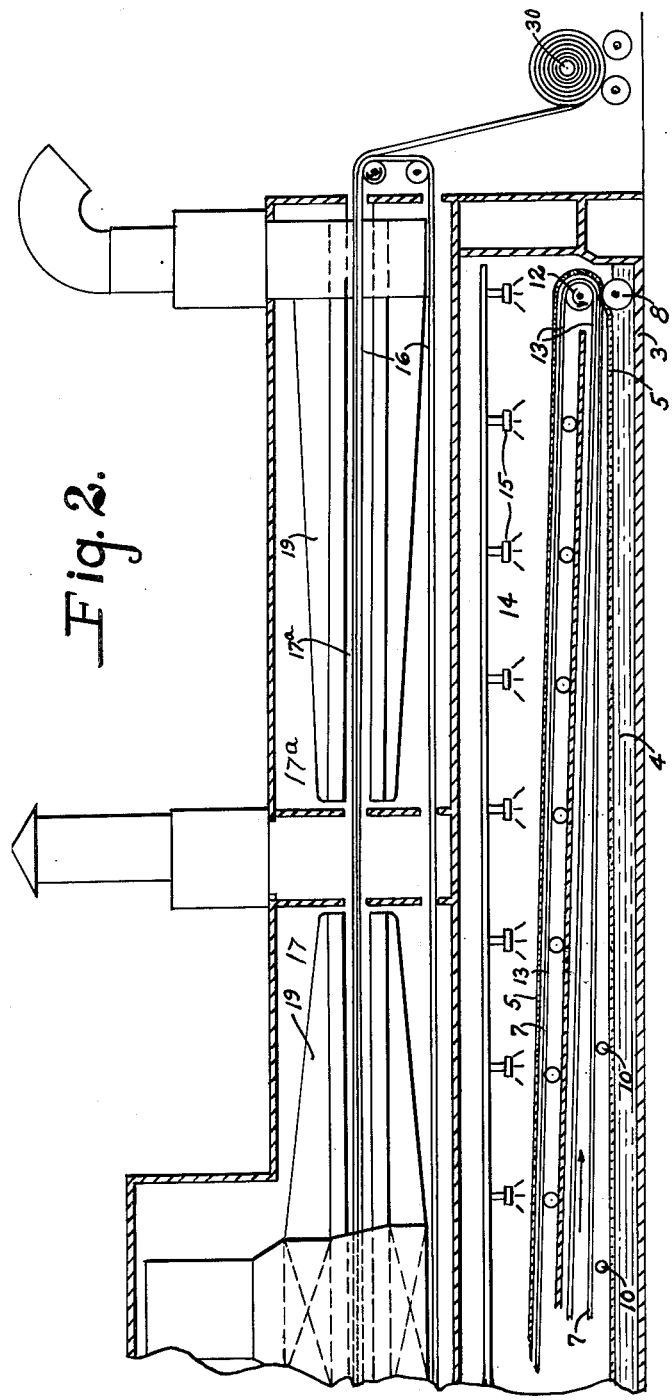
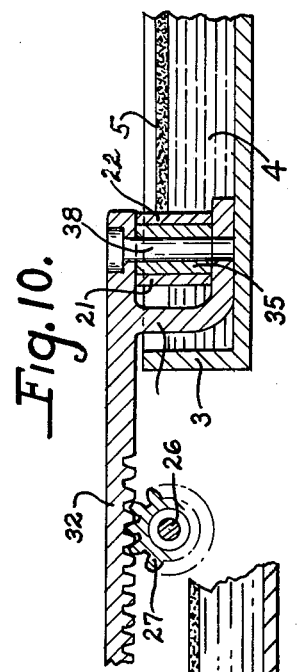
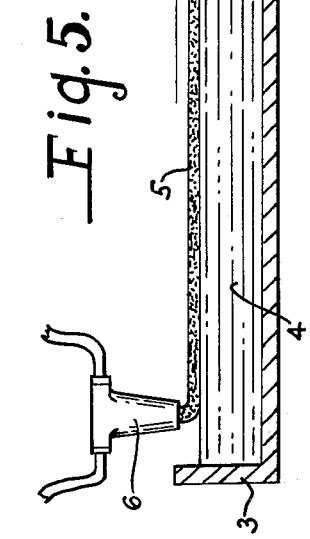
INVENTORS
Royal C. Taft Jr.
Robert R. Hodgson
BY Louis C. Smith
Attorney Dec. 19, 1961 R. C. TAFT, JR., ET AL 3,013,924
METHOD OF PRODUCING FOAM MATERIAL IN WEB FORM
Filed May 21, 1958 4 Sheets-Sheet 3

INVENTOR.
Royal C. Taft Jr.
Robert R. Hodgson
BY Louis C. Smith
Attorney

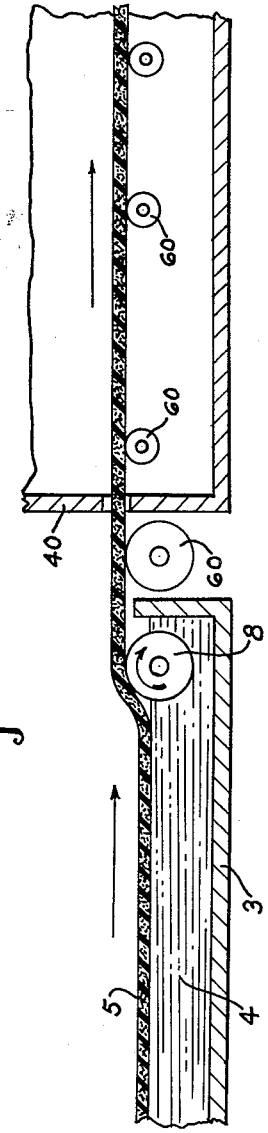
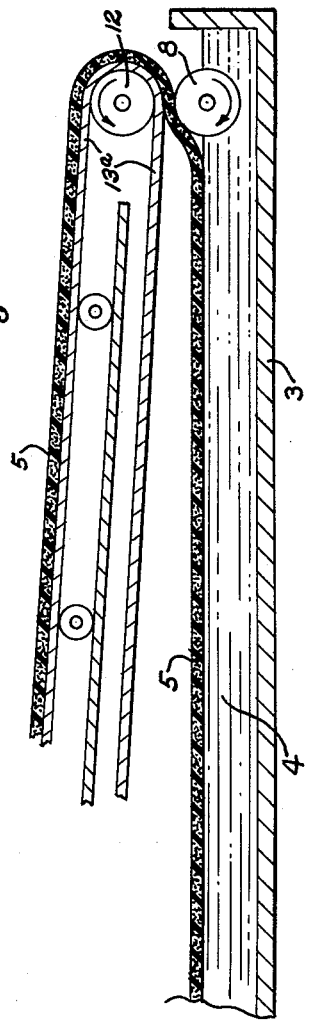

United States Patent Office 3,013,924
Patented Dec. 19, 1961

3,013,924
METHOD OF PRODUCING FOAM MATERIAL IN WEB FORM
Royal C. Taft, Jr., and Robert R. Hodgson, Hingham, Mass., assignors to Midland-Ross Corporation, New York, N.Y., a corporation of Ohio
Filed May 21, 1958, Ser. No. 736,827
4 Claims. (Cl. 156—78)

This invention relates to foam material of the type in which the foam-forming mixture is in the form of a freely flowing liquid, which, when the foaming takes place, is converted into a self-supporting, cellular structure, which has a sticky or tacky character and which, when cured, loses its sticky or tacky character. Some foam materials are resilient when they are cured and return to their original shape after being deformed.

Polyurethane foamed material is an example of this type.

Such foam material is frequently made in web or sheet form and is used for various purposes, among which may be mentioned to provide a backing for sheet material.

One object of the invention is to provide a novel method of producing such foam material.

Another object of the invention is to provide a method which facilitates the production of a web or sheet of foam material which has a uniform thickness.

Still another object of the invention is to provide a novel method according to which the mixture in liquid form of the ingredients from which the foam material is produced is deposited on the smooth surface of a body of quiescent liquid on which the liquid mixture floats during the foaming process.

A further object of the invention is to provide a novel method of producing foam material which includes not only depositing a layer of liquid foam-forming mixture on the smooth surface of a liquid-supporting body, on which surface the liquid foam-forming mixture will float while the foaming action takes place, but also includes treating the bottom face of said layer as it is floating on the supporting liquid so as to give said bottom face a non-tacky character.

An additional object of the invention is to provide a novel method of producing foam material in continuous web form and applying said web progressively and continuously to a web of sheet material.

An advantage of using a liquid support for the foam-forming mixture is that the friction between said mixture and the surface of the supporting liquid is negligible and hence said liquid mixture, when deposited on the surface, will flow freely over and spread out thereon to automatically form a layer of uniform thickness.

Another advantage is that by using a supporting liquid of a proper temperature, said liquid provides the heat necessary to accelerate the development of a non-tacky bottom surface on the layer of foam material during the foaming action so that when such foaming action terminates and the layer has acquired a self-supporting cellular structure, the tacky characteristic will have been eliminated from its bottom face.

The novel method and an apparatus for carrying out said method is shown in the drawings in which FIG. 1 is a vertical sectional view of one end of such an apparatus.

FIG. 2 is a view similar to FIG. 1 and constituting a continuation thereof and showing the other end of the apparatus.

FIG. 3 is an enlarged sectional view showing the manner in which the foamed sheet is applied to a web of sheet material.

FIG. 5 is a section on the line 5—5, FIG. 4.

FIGS. 8 and 9 are fragmentary sectional views illustrating different procedures which may be employed to produce a foamed web in accordance with the invention.

FIG. 10 is an enlarged section on the line 10—10, FIG. 4.

Figure 4:
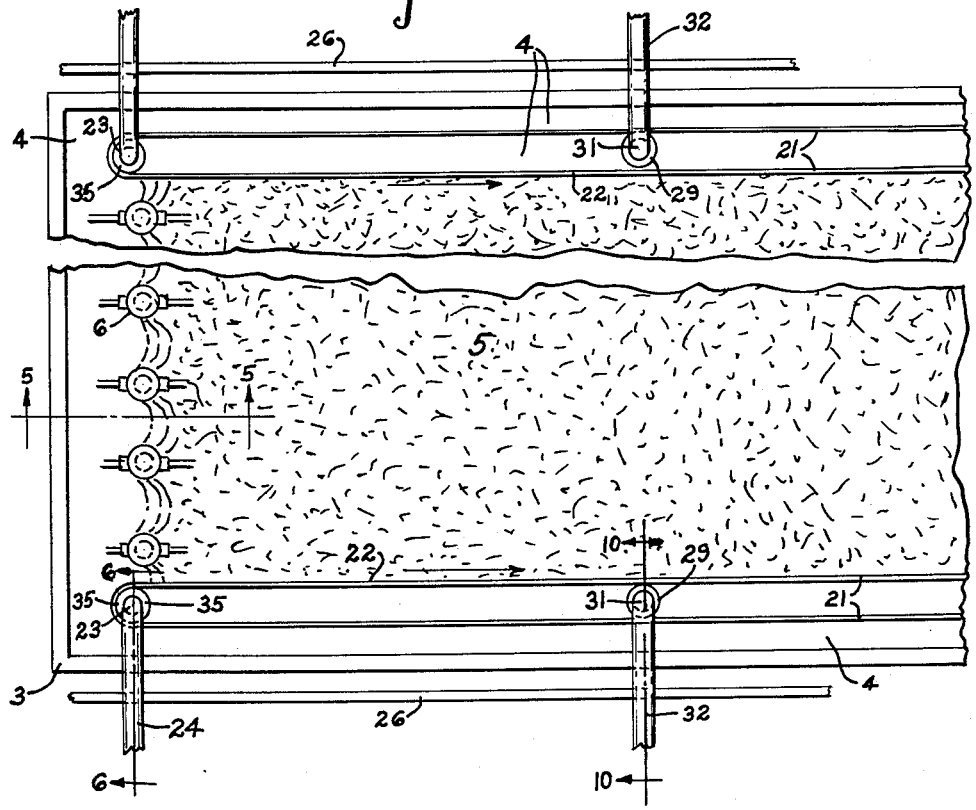
FIG. 4 is a fragmentary plan view showing the manner in which the ingredients for forming the foamed material are deposited on a body of liquid.

The apparatus herein illustrated includes an elongated tank 3 containing a body 4 of quiescent liquid which presents a smooth top surface and means for depositing on said surface a layer 5 (of uniform thickness) of a composition in liquid form from which the foamed product is developed.

The liquid 4, which will be referred to as a "supporting liquid," has a specific gravity greater than that of the liquid composition or mixture 5 so that the liquid mixture 5 will float on the surface of the supporting liquid and flow over said surface to produce thereon a layer of uniform thickness.

The deposit of this liquid composition or mixture may be accomplished by any suitable means, but preferably by means of a plurality of mixing heads or nozzles 6, to each of which is delivered in proper proportions the ingredients for producing the foam material, each mixing head operating to mix the ingredients and then to deliver the mixture onto the surface of the supporting liquid 4. Because of the liquid character of the mixture 5 and the negligible friction between it and the surface of the supporting liquid 4, said liquid mixture, when deposited on the supporting liquid, will flow freely over and spread evenly on its surface to form a layer of substantially uniform thickness. This layer is moved forward over the surface of the supporting liquid as fast as the foam-forming liquid mixture is deposited thereon, and thus a continuous layer will be produced.

To successfully carry out the method herein described, the supporting liquid 4 should have a specific gravity greater than that of the liquid foam-forming material so that the latter will float on the former. Furthermore the chemical ingredients of the supporting liquid should be such that they will not interfere with the foaming action of the foam-forming mixture.

The ingredients of the liquid mixture or composition from which the foam material is to be made will vary depending on the desired character of said foam material. If polyurethane foam material is the product to be made such liquid composition may be tolylene diisocyanate and polyester or polyether in proper proportions mixed with water, and water may be used as the supporting liquid.

This mixture has the characteristic that a few seconds after the ingredients are mixed a foaming reaction takes place and carbon dioxide gas is released. With the apparatus herein illustrated this foaming action takes place as the layer 5 is moving over the surface of supporting liquid 4. The length of the tank 3 has such a relation to the speed at which the foaming material is moving over said surface that by the time any portion of the foaming layer has reached the end of the tank opposite to that on which the mixture was deposited on the supporting liquid, that is, the end of the tank shown in FIG. 2, the foaming action of the mixture will have terminated and said material will have a self-supporting cellular structure. At this point the foamed layer is separated from the surface of the supporting liquid and subjected to a curing treatment.

The separating of the foamed material from the surface of the supporting liquid 4 may be accomplished by means of a separating roll 8 located at the delivery end of the tank and rotating in the direction of the arrow and which is of such a size that the upper portion thereof projects above the level of the supporting liquid 4. As any portion of the foamed layer 5 reaches the roll 8 it is carried over the roll as shown in FIG. 3 and is thus raised off from the surface of the supporting liquid.

Normally when the foaming action of a polyurethane foam material terminates the resulting self-supporting cellular mass has a sticky or tacky characteristic, which makes it difficult to handle, but in accordance with the present invention, while the foaming layer 5 is floating on the supporting liquid 4 the bottom face of said layer is subjected to a moderate elevated temperature (100° F. to 150° F.) which serves to accelerate the curing of said foaming material on its bottom face, with the result that by the time that any portion of said material has reached the end of the tank, the bottom face of the layer 5 will have been cured to the point at which the tacky characteristic of said face will have been eliminated, although the top face of the web or layer will still be tacky.

The bottom face of the layer 5 may be subjected to the moderate elevated temperature by any suitable means, but one convenient way is to have supporting liquid 4 in the tank 3 heated to the proper temperature so that said foaming web is in direct contact with and rests on a heated surface.

The foamed web therefore will pass over the roll 8 without adhereing thereto.

If it is desired simply to produce a web or sheet of foamed material which subsequently may be applied to some sheet material to form a backing therefor, or may be used for some other purpose, said layer 5, which comes from the roll 8 in web form, may be conveyed immediately to a heated curing unit 40 in which it is completely cured, as shown in FIG. 8.

As stated above however, one feature of the invention relates to applying the foamed web 5 to the back of sheet material as soon as it is separated from the supporting liquid 4 and while the top face of said web is still tacky.

Although this invention is applicable for producing foam material of various types and also for applying it to a wide variety of different materials in web or sheet form, yet for convenience, and without imposing any limitations on the invention, the web or sheet material to which the foamed web is to be applied will be referred to as a fabric, and is shown at 7 in the drawings.

In applying the foamed web 5 to the fabric 7, which is shown as in the form of a long strip and which may be taken from a supply roll (not shown), said fabric is fed over a series of supporting rolls 10 directly onto the tacky top face of the foamed web 5 as said web is passing over the roll 8 as best seen in FIG. 3. Situated above the roll 8 is a pressure roll 12 which serves to press firmly together the foamed web 5 and the fabric 7 as they pass between the rolls 8 and 12, thereby increasing the adhesion between said foamed web and fabric. The two adhesively united webs 5 and 7 are taken by an endless conveyor 13, which is supported by the roll 12 at one end and by a roll 12a at the other end, and carried through a steam chamber 14 which is supplied with steam by means of steam spray nozzles 15. The steam serves to heat the combined fabric 7 and foamed web 5, thereby assisting the curing or gelling of the said web.

After passing through the steam chamber, the adhesively united webs 5 and 7 are taken by a second endless conveyer 16 and are carried through a heated curing chamber 17 situated above the steam chamber 14 and in which the foamed web 5 is completely cured and permanently bonded to the fabric 7, and in which the laminated product is dried.

Any desired means for supplying heat to the chamber 17 may be employed; such, for instance, as the drying and heating means shown in either of the U.S. Patents 2,391,764—December 25, 1945, or 2,473,624—June 21, 1949, said heating means being indicated conventionally at 19 in the drawings.

After passing through the heating and curing chamber 17, the laminated web is carried by the conveyor 16 through a cooling chamber 17a in which it is cooled. After it is delivered from the cooling chamber, it may be wound up on a receiving roll 30. The cooling may be accomplished by blowing cool air on to the top and bottom of the laminated web through the hood-like elements 19a that are located above and below said web, and which may have a construction similar to that shown in the above-mentioned patents.

Any suitable means may be used to provide the web 5 with straight edges during the foaming operation and while it is moving over the surface of the supporting liquid 4. A simple means is shown in the drawings which consists of two parallel movable edge-defining walls 22 which are located in and extend from one end of the tank to the other, and between which the foam-forming mixture is delivered from the nozzles 6 as seen in FIG. 4. Said walls limit the lateral flow of mixture delivered from the nozzles and may be considered as defining a lane or path through which the foam-forming mixture moves. Said walls also produce the straight edges of the sheet 5. These walls 22 are movable in the direction of their length and at the same speed as that at which the foaming material is moving over the surface of supporting liquid so that there is no relative movement between the walls and the foaming material. Said moving walls are made of some suitable release material to which the foaming mixture will not adhere, and hence when the foamed web 5 is separated from the liquid 4 by the separating roll 8 the edges of the foamed material will slide freely off from the walls 22 without being damaged in any way.

In the construction shown these walls are constituted by two endless belts 21 arranged with their width dimension extending vertically, each belt being supported at each end on a roller 35. One roller 35 of each pair may be a driven roller which moves the corresponding belt at the proper speed. The inner stretch 22 of each belt is the portion thereof that constitutes the edge defining wall.

Figure 6:
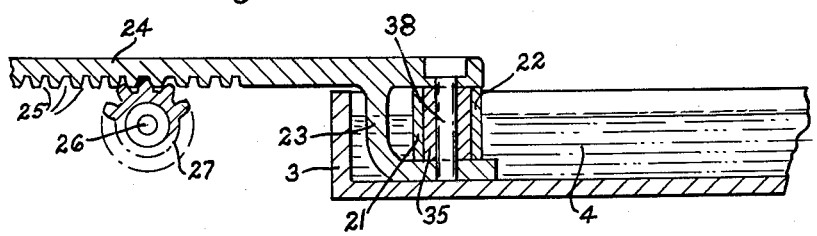
FIG. 6 is an enlarged section taken on line 6—6 FIG. 4.
Figure 7:
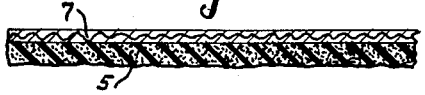
FIG. 7 is a sectional view of foamed material applied to sheet material.

The two endless belts 21 which form the edge defining walls are adjustable toward and from each other whereby the distance between the said walls may be increased or decreased to provide a foamed web of any desired width within the limits of the apparatus. For this purpose each roll 30 is carried by a supporting bracket 23 and is mounted therein to rotate about a vertical axis. The brackets 23 are movable transversely of the length dimension of the tank 3, and thereby the desired adjustment of the edge defining walls can be made. Each bracket is provided with an arm 24 which extends laterally some distance beyond the side of the tank, each arm being provided with rack teeth 25 as shown in FIG. 6. A shaft 26 extends along each side of the tank outside thereof, and each shaft has fast thereon pinions 27 which mesh with rack teeth on the arms 24. By rotating the shafts 26 the brackets 23 for either belt 28 can be moved simultaneously for making an adjustment of the belt transversely of the tank.

The edge defining walls 22 extend from one end of the tank to the other and hence are of considerable length. In order to maintain each wall in its proper position throughout its length a pluraltiy of supporting rolls 29 are provided for each belt, each of which rolls rotates about a vertical axis and is situated between the two stretches of the corresponding belt and in position to prevent the edge defining section 22 of the belt from any outward movement.

Each supporting roll 29 is mounted in a bracket 31 similar to the brackets 23, and each bracket 31 has an arm 32 similar to the arms 24 of the brackets 23. Each arm 32 is provided with rack teeth which mesh with a pinion that is fast on the shaft 26. The supporting rolls are thus adjustable simultaneously with the belt carrying rolls 35.

As previously stated, if it is desired to produce a continuous foamed web in accordance with this invention which is not immediately to be applied to sheet material the procedure illustrated in FIG. 8 may be employed. There is shown in FIG. 9 a different apparatus by which a foamed web may be cured independently and without being bonded to sheet material. Such apparatus is similar to that shown in FIGS. 1 and 2, except that it has no provision for feeding sheet material to the foamed web.

In FIG. 9, the tank 3 containing the supporting liquid 4, the separating roll 8 and the pressure roll 12, are the same as illustrated in FIG. 1, 2 and 3. In the device in FIG. 9, however, the endless conveyor 13a, which corresponds to the conveyor 13 in FIGS. 1, 2 and 3, and is supported on the roll 8, is made of release material to which tacky foamed material will not adhere. In producing a foamed web 5 with the device of FIG. 9, a layer of uniform thickness of a liquid foam-forming mixture is deposited on the surface of the supporting liquid 4 and the foaming action takes place while said mixture is floating on and moving over said surface, as previously described. By the time any portion of the foamed layer has reached the separating roll 8, the bottom face of the foamed layer will have been reduced to a non-tacky condition by the heat emanating from the heated supporting liquid, as above described. As the web or layer 5 is separated from the supporting liquid 4 by the roll 8 it will be brought into contact with the endless conveyor 13a, which is made of release material so that the tacky top face of the foamed web will not adhere thereto, and said web 5 will be carried by said conveyor through the steam chamber 14 and after emerging from the latter will be taken by the conveyor 16 and carried through the heated curing chamber 17 and then through the cooling chamber 17a, as above described.

We claim:

1. The method of producing foam material in web form and applying it to sheet material to provide the latter with a resilient backing, which method consists in depositing continuously on the smooth surface of a body of quiescent liquid a layer of a liquid foam-forming mixture from which foam material is produced and which has a specific gravity less than that of the supporting liquid, whereby said foam-forming mixture floats on the supporting liquid, carrying out the foaming process while the foam-forming mixture is floating on the supporting liquid, thereby to convert the foam-forming mixture into a foamed web having a self-supporting structure and also having a tacky characteristic, applying force to a portion of said web that has been converted into a self-supporting structure by which said web is moved over the surface of the quiescent supporting liquid, subjecting the bottom face of said web while it is still floating on and moving over the quiescent supporting liquid to an elevated temperature sufficient to render said bottom face free from tackiness while maintaining the tacky characteristic of the upper face of said web, removing the foamed web from the supporting liquid after its bottom face has lost its tacky characteristic but while the upper face is still in a tacky condition and applying sheet material to the tacky upper face of said foamed web.

2. The method of producing foamed material in a continuous web form and applying it progressively to a continuous web of sheet material, which method consists in depositing a liquid foam-forming mixture continuously on the smooth surface of quiescent liquid which has a greater specific gravity than that of said mixture, whereby said mixture will flow over and float on the surface of the quiescent liquid and form thereon a layer of uniform thickness, moving said layer as it is formed over the surface of the quiescent liquid, thereby to produce a continuous layer of said foam-forming mixture, carrying out the foaming process in said layer progressively as it moves over the surface of the quiescent liquid, whereby said layer is progressively converted into a foamed web having a self-supporting cellular structure and which also has a sticky or tacky character, subjecting the bottom face of the foamed web while it is still floating on the quiescent liquid to sufficient heat to eliminate the tacky character thereof while leaving the top surface of the foamed web still in a tacky condition, removing the foamed web progressively from the surface of the quiescent liquid while the top face thereof is still in a tacky condition, feeding a web of sheet material progressively onto the tacky top face of the foamed web as it is moving forward and after said web has been removed from the quiescent supporting liquid, and pressing together the web of sheet material and the foamed web as they come into contact with each other thereby to bond them together.

3. The method of producing foam material in web form and applying it to sheet material to provide the latter with a resilient backing, which method consists in depositing continuously on the smooth surface of a body of liquid a layer of a liquid foam-forming mixture from which foam material is produced and which has a specific gravity less than that of the supporting liquid, whereby said foam-forming mixture floats on the supporting liquid, carrying out the foaming process while the foam-forming mixture is floating on the supporting liquid, thereby to convert the foam-forming mixture into a foamed web having a self-supporting structure and also having a tacky characteristic, applying force to a portion of said web that has been converted into a self-supporting structure by which said web is moved over the surface of the supporting liquid, subjecting the bottom face of said web while it is still floating on and moving over the supporting liquid to an elevated temperature sufficient to render said bottom face free from tackiness while maintaining the tacky characteristic of the upper face of said web, removing the foamed web from the supporting liquid after its bottom face has lost its tacky characteristic but while the upper face is still in a tacky condition and applying sheet material to the tacky upper face of said foamed web.

4. The method of producing foamed material in a continuous web form and applying it progressively to a continuous web of sheet material, which method consists in depositing a liquid foam-forming mixture continuously on the smooth surface of liquid which has a greater specific gravity than that of said mixture, whereby said mixture will flow over and float on the surface of the liquid and form thereon a layer of uniform thickness, moving said layer as it is formed over the surface of the liquid, thereby to produce a continuous layer of said foam-forming mixture, carrying out the foaming process in said layer progressively as it moves over the surface of the liquid, whereby said layer is progressively converted into a foamed web having a self-supporting cellular structure and which also has a sticky or tacky character, subjecting the bottom face of the foamed web while it is still floating on the liquid to sufficient heat to eliminate the tacky character thereof while leaving the top surface of the foamed web still in a tacky condition, removing the foamed web progressively from the surface of the liquid while the top face thereof is still in a tacky condition, feeding a web of sheet material progressively onto the tacky top face of the foamed web as it is moving forward and after said web has been removed from the supporting liquid, and pressing together the web of sheet material and the foamed web as they come into contact with each other thereby to bond them together.

(References on following page)

References Cited in the file of this patent

UNITED STATES PATENTS

| | | |
|---|---|---|
| 2,308,951 | Novotny et al. | Jan. 19, 1943 |
| 2,434,527 | Untiedt | Jan. 13, 1948 |
| 2,607,081 | Taylor | Aug. 19, 1952 |
| 2,648,619 | Alderfer | Aug. 11, 1953 |
| 2,702,769 | Alderfer | Feb. 22, 1955 |
| 2,760,233 | Bjorksten | Aug. 28, 1956 |
| 2,841,205 | Bird | July 1, 1958 |
| 2,880,468 | Mooney et al. | Apr. 7, 1959 |